Jan. 21, 1930.  A. I. MARCUM  1,744,320
VEHICLE DRIVING MECHANISM
Filed March 22, 1928
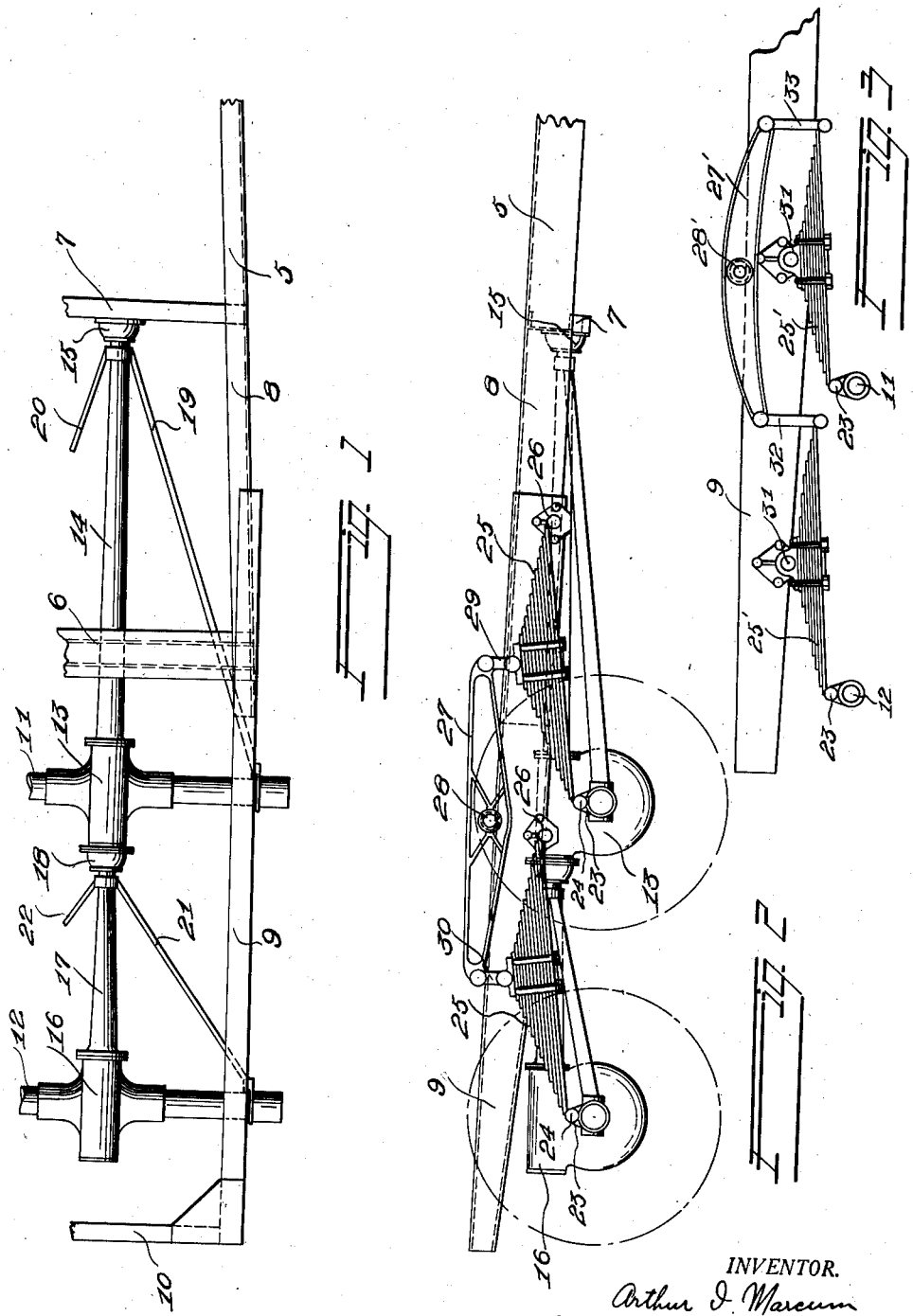

Patented Jan. 21, 1930

1,744,320

UNITED STATES PATENT OFFICE

ARTHUR I. MARCUM, OF OAKLAND, CALIFORNIA, ASSIGNOR TO EMORY WINSHIP, OF SAN FRANCISCO, CALIFORNIA

VEHICLE DRIVING MECHANISM

Application filed March 22, 1928. Serial No. 263,727.

This invention relates to a road vehicle of the type that includes a pair of driven axles disposed adjacent one end of the vehicle, and more particularly to vehicles of this type that are constructed from an ordinary vehicle, including but a single driven axle disposed adjacent the rear of the chassis, by the addition to the frame of such vehicle of an extension therefor, and by the further addition thereto of a second drive axle suitably interconnected to the frame and to the other axle.

A primary object of the invention is to provide an extremely simple and practical multi-wheel road vehicle that is built up from an ordinary two axle vehicle by the addition thereto of an extension for the frame and an additional drive axle, utilizing duplicate parts of the vehicle wherever possible.

A further object of the invention is to provide a multi-wheel road vehicle embodying a through drive shaft housed in torque tubes that are flexibly supported at one end and serve to hold the axles in properly spaced position.

A still further object of the invention is to provide a through drive for a multi-drive axle vehicle, and torque tubes to separately resist the torque reactions imposed on the housing of each axle, the drive shaft sections being housed within the torque tubes and provided with flexible joints at the points at which the through drive shaft is flexible, whereby an extremely compact and practical arrangement is provided.

A still further object of the invention is to provide a spring suspension that will yieldingly resist the movement of the several drive axles toward and from the frame, permitted by their connection to the frame while allowing a relatively large range of movement of each axle, and in which springs are provided that are individual to each axle and including means to equalize or distribute the load on the several axles and to transmit a substantial portion of the shocks to which one axle may be subjected to the springs of the other drive axle.

Further objects of the invention will appear as the description thereof proceeds with reference to the accompanying drawings in which, Figure 1 is a fragmentary plan view of a multi-drive axle vehicle constructed in accordance with this invention, the wheels and springs being omitted.

Figure 2 is a side elevation of the vehicle, the wheels being omitted but diagrammatically indicated in outline.

Figure 3 is a side elevation of a modified form of spring suspension.

Similar reference characters indicate like parts throughout the several views.

The improved vehicle of this invention is preferably constructed from an ordinary vehicle having only a single drive axle by the addition thereto of an extension to the frame and by the further addition of a second drive axle preferably of a construction similar to the first axle. In the drawings the numeral 5 indicates a portion of the frame of an ordinary vehicle having a single drive axle. Said frame includes transverse members 6 and 7 rigidly secured to longitudinal members 8. The frame just described is extended rearwardly by attaching to each longitudinal member 8 a member 9 that is rigidly secured thereto in any suitable manner, as by lapping a portion of each of members 8 and 9 and securing the lapped portions together. Members 9 are rigidly connected together by transverse member 10. The parts so far referred to, being all rigidly united together, form an elongated frame for the improved vehicle.

Arranged adjacent the rear end of the frame just described are drive axles 11 and 12. The axle 11 is provided with a housing 13 for the usual differential and for a gear such as a worm to drive said differential. The axle 11 is held in proper position endwise of the frame by a torque tube 14 that is rigidly bolted at one end to the housing 13 and that is connected at its other end by means of a universal joint 15 to the transverse member 7 of the frame 5. The drive shaft for the gear such as a worm included in the housing 13 extends through the tube 14 and is provided with a universal joint, the center of which is approximately coincident with the center of the universal joint 15.

The axle 12 is provided with a housing 16 containing the usual differential and a gear for actuating the same, such as a worm. Said axle is held in proper position endwise of the frame by a torque tube 17 that is rigidly bolted at one end to the housing 16 and that is connected at its other end to the housing 13 by means of a universal joint 18. The drive shaft for the axle 11 extends through the housing 13 and continuously through the torque tube 17 to operate the worm that drives the rear axle 12. Said drive shaft is also provided with a universal joint disposed within the universal joint 18 so that the center thereof is approximately coincident with the center of the universal joint 18.

In order to firmly hold the ends of the axles in proper position endwise of the frame the axle 11 is provided with radius rods 19 and 20 each secured at one end to the axle 11 adjacent an end of the axle. The other end of each of said radius rods is rigidly united in any suitable manner to the torque tube 14 adjacent the universal joint 15 thereof. The ends of the axle 12 are likewise supported from movement endwise of the frame by radius rods 21 and 22 each rigidly secured at one end to the torque tube 17 adjacent the universal joint 18 and at its other end to the axle 12 adjacent an end thereof.

By the arrangement so far described the axle 11 is held from movement endwise of the frame by the torque tube 14 and the radius rods 19 and 20. However, said axle is free to swing in a substantially vertical plane and to tilt with respect to a line passing centrally longitudinally of the frame, this action being permitted by the universal joint 15. Similarly the axle 12 is held from movement toward the axle 11 and endwise of the frame, since the axle 11 itself is incapable of moving in this direction by the torque tube 17, and the radius rods 21 and 22. The universal joint 18 however, permits the axle 12 to swing freely in vertical planes and to tilt with respect to a line passing centrally longitudinally of the frame.

In order to yieldingly resist the movements of the axles 11 and 12 just described and in order that the shocks applied to one axle may be transmitted in part to the other axle the axles are yieldingly connected to the frame in a manner about to be described. This arrangement is illustrated in Figure 2 of the drawings showing the arrangement on one side of the frame. It will be clear to any person skilled in the art that this arrangement is duplicated at the other side of the frame. Each of the axles 11 and 12 is provided with a short arm 23 that is united at one end to the axle by means of a universal joint about which said arm is free to swing. The other end of each of these arms is pivotally connected by means of a pin 24 to the end of a leaf spring assembly 25 provided for each axle. The opposite end of each of the spring assemblies 25 is pivoted at 26 to the frame. Leaf spring assemblies 25 may be of conventional form. If it is desired to convert a Ford truck into a multi-wheel vehicle the spring assemblies 25 may be of the Ford type. Similarly if another type of car is converted into a multi-wheel vehicle, the springs are preferably of the kind that are standard in that type.

In order to equalize the load on the axles and in order that the shocks to the springs of one axle may be transmitted in part to the springs of the adjacent axle the spring assemblies 25 are connected together by a lever 27 that is pivoted at 28 to the frame of the vehicle. The ends of said lever are shackled to the mid portions of the spring assemblies 25 by shackles 29 and 30.

A modified form of spring suspension that may be used in lieu of that just described is illustrated in Figure 3 of the drawings. As shown in this figure each of the axles 11 and 12 is provided with a short arm 23 at each side of the vehicle united at one end to the axle by a universal joint about which said arm is free to swing as in the form of the invention shown in Figure 2. The other end of each of said arms is pivotally connected to spring suspensions 25' provided for each axle. Each of said spring suspensions 25' is pivotally attached to the frame member 9 at 31 the connection between each spring and the frame being at a point substantially midway between the ends of said suspensions. The other end of each of said spring suspensions is shackled to an end of an equalizing lever 27' pivoted at 28' to the frame member 9 by shackles 32 and 33. This arrangement secures most of the results secured by the preferred form of spring suspension shown in Figure 2, though the frame movement due to movements of the axle is greater in this form of the invention since the springs individual to the axles are pivoted to the frame between their ends, while in the form of the invention shown in Figure 2 the springs are connected between their ends to the equalizing lever. This form of the invention, however, has an advantage that is not inherent in the construction shown in Figure 2, in that the equalizing lever may be disposed in a lower position than in the last named figure, permitting a lowering of the floor line.

In operation, power is transmitted to the drive axles 11 and 12 by means of the continuous drive shaft contained in the torque tubes 14 and 17. The torque reactions imposed on the housings of said drive axles are resisted by said torque tubes, which also serve the purpose of holding the axles in definite spaced relation endwise of the frame. In view of the universal joints 15 and 18 however, each axle is free to rise and fall or to tilt in vertical planes as the wheels carried thereby pass over irregularities in the road. When irregularities are encountered by the wheels the upward movement of each axle is resisted by the springs 25, or 25' the arms 23 permitting the pivotal connection at the end of each spring to move in the arc of a circle when the spring deflects so that destructive shocks are not transmitted to the torque resisting connection and the drive shaft housed thereby. It will be observed further that when the axle 11 (Figure 2) moves in a vertical plane carrying with it the end 24 of one of the spring assemblies 25, the shackle 29 will be carried upwardly a distance substantially equal to one half the movement of the axle, because the connection of the shackle 29 to the spring 25 is made at a point midway between the pin 24 and the pivotal connection 26 of the spring assembly to the frame. Upward movement of the shackle 29 causes the lever 27 to swing on its pivot 28 transmitting the shock in a downward direction to the companion spring assembly 25 on the same side of the vehicle in a manner that will be readily understood. It will thus be seen that each drive axle is free to move substantially in a vertical plane without causing a corresponding movement of the frame of the vehicle, and that the shocks to a spring that is individual to one axle are transmitted in a reverse direction to the spring that is individual to the other axle and positioned at the same side of the vehicle. Further, in view of the fact, that the flexible joints 18 and 15 in the torque tubes 17 and 14 are coincident with the universal joints in the drive shaft that is housed in these torque tubes, the freedom of the drive axles just referred to is permitted without setting up destructive stresses in the drive shaft or in the torque connections.

In the form of the invention shown in Figure 3 shocks to one axle are transmitted to the spring suspension individual to that axle and partially absorbed thereby. Movement of each axle beyond the absorbing capacity of the springs individual thereto cause a swinging movement of the spring 25' about pivot 31. Such movement causes the opposite end of spring 25' to move in a direction opposite to the axle movement. This movement is yieldingly resisted by equalizing lever 27' because the swinging of said lever is yieldingly resisted by its connection to the other spring at the same side of the vehicle.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What I claim as my invention is:

1. A multi-wheel road vehicle comprising a frame, a pair of drive axles disposed adjacent one end of said frame, a rigid torque resisting arm extending forwardly from each of said drive axles, one of said arms being united to said frame by a universal joint and the other of said arms being united to the adjacent axle by a universal joint whereby said axles are flexibly held in position by said axles with respect to said frame, and springs arranged longitudinally of the frame to yieldingly resist the movement of each of said axles toward and from said frame, said springs being connected to said axles by arms that permit limited universal movement of the springs at the points at which the springs are connected to said axles.

2. A multi-wheel road vehicle comprising a frame, a pair of drive axles disposed adjacent one end of said frame, a rigid torque resisting arm extending forwardly from each of said drive axles, one of said arms being united to said frame by a universal joint and the other of said arms being united to the adjacent axle by a universal joint whereby said axles are flexibly held in position with respect to said frame, a pair of springs secured by swinging arms to each axle, each spring being pivoted to said frame at one end and equalizing means connecting other portions of said springs at the same side of the vehicle to said frame, said equalizing means being pivoted to said frame between its ends.

3. The combination defined in claim 2 in which the torque arms and the universal joints are in substantial alignment longitudinally of the frame and house a continuous drive shaft that is flexible at said universal joints.

4. A multi-wheel road vehicle comprising a frame, a pair of drive axles disposed adjacent one end of said frame each drive axle being provided with a rigid arm of substantial length extending laterally therefrom, the arm of the forward of said axles being connected to said frame by a universal joint, a pair of springs for each axle, each of said springs being pivotally connected to said frame at one end and connected to an axle at its other end by means of an arm that is flexibly united to said spring and to said axle and a lever pivoted to said frame between its ends at each side of said vehicle, opposite ends of said lever being shackled to intermediate portions of the springs individual to the axles at the same side of said vehicle.

5. The combination defined in claim 4 in which said rigid arms are tubes that house a continuous drive shaft that is flexible at the points at which said arms are flexibly united to said frame or to one of said axles.

6. A multi-wheel road vehicle comprising a frame, a pair of drive axles disposed adjacent one end of said frame, a rigid torque resisting arm extending forwardly from each of said drive axles, one of said arms being united to the frame by means including a universal joint and the other of said arms being united to the adjacent axle by means including a universal joint, whereby said axles are enabled to swing and to tilt with respect to each other and each with respect to a predetermined point, and a longitudinally arranged spring mechanism at each side of the frame for resiliently connecting the axles to the frame, said mechanisms including springs and shackles flexibly connecting said springs with the said axles.

7. In the construction defined in claim 6, said shackles being universally mounted with respect to said axles and attached to the spring ends on horizontal pivots.

In testimony whereof I affix my signature.

ARTHUR I. MARCUM.